United States Patent [19]
Nishizawa

[11] Patent Number: 5,518,267
[45] Date of Patent: May 21, 1996

[54] SAFETY DEVICE FOR A MECHANICAL IGNITER OF A GAS GENERATOR

[75] Inventor: Muneo Nishizawa, Shiga, Japan

[73] Assignee: Takata Corporation, Tokyo, Japan

[21] Appl. No.: 182,590

[22] Filed: Jan. 18, 1994

[30] Foreign Application Priority Data

Jan. 27, 1993 [JP] Japan .................................. 5-029643

[51] Int. Cl.$^6$ .................................................. B60R 21/32
[52] U.S. Cl. ......................... 280/734; 280/806; 411/535; 411/553
[58] Field of Search ..................... 280/806, 734; 180/282; 297/480; 200/61.45 R, 61.53; 411/535, 536, 553, 552, 549, 340, 341, 347, 356, 511

[56] References Cited

U.S. PATENT DOCUMENTS

| | | | |
|---|---|---|---|
| 3,675,280 | 7/1972 | Winslade | 411/552 |
| 4,916,836 | 4/1990 | Baggio et al. | 411/535 |
| 4,955,638 | 9/1990 | Kinoshita et al. | 280/734 |
| 5,129,680 | 7/1992 | Mori | 280/806 |
| 5,143,403 | 9/1992 | Fohl | 280/806 |
| 5,149,134 | 9/1992 | Fohl | 280/806 |
| 5,163,709 | 11/1992 | Mori | 280/806 |

FOREIGN PATENT DOCUMENTS

| | | | |
|---|---|---|---|
| 0462482 | 3/1937 | United Kingdom | 411/553 |
| 0630413 | 10/1949 | United Kingdom | 411/553 |
| 2220128 | 1/1990 | United Kingdom . | |

OTHER PUBLICATIONS

"Simmons Fasteners", Simmons Fastener Corp. Jan. 29, 1962, p. 42.

Primary Examiner—Paul N. Dickson
Attorney, Agent, or Firm—Brumbaugh, Graves, Donohue & Raymond

[57] ABSTRACT

A mechanical igniter for a gas generator has a weight, a latch lever and a firing pin, which are provided in a casing as movable elements to fire a percussion cap attached to the gas generator in response to acceleration. The mechanical igniter further has a restraint member movably supported in the casing as a safety catch for making the movable elements immovable. The casing and the restraint member are respectively formed with cam surfaces which cooperate with each other to rotate the restraint member about its own axis so that the restraint member is selectively set in a restraint position and a release position. The restraint member has a rotary control portion that is concealed in the casing and has a portion that is engageable by a rotary tightening tool, such as used in an ordinary bolt tightening operation or the like. The restraint member is rotated by engaging the rotary tightening tool with the rotary control portion of the restraint member and turning the tool. As a result of the rotation, the restraint member is displaced from the restraint position to the release position and set in the latter position by the cooperation of the cam surfaces. Thus, the movable elements are released from the immovable state, thereby allowing the igniter to fire the percussion cap in response to acceleration.

2 Claims, 4 Drawing Sheets

SAFETY DEVICE FOR A MECHANICAL IGNITER OF A GAS GENERATOR

BACKGROUND OF THE INVENTION

The present invention relates to a mechanical igniter for a gas generator that supplies a working gas to a pretensioner in a seat belt system or to an air bag in an air bag system. More particularly, the present invention relates to a safety device used to prevent an erroneous actuation of the mechanical igniter.

Vehicles, for example, automobiles, are often provided with a seat belt system or an air bag system or both. For a pretensioner in the seat belt system or an air bag in the air bag system, a gas generator is employed as a device for generating a driving medium for the pretensioner or the air bag. The gas generator is activated by a combination of an acceleration sensor and an igniter which is activated in response to a signal from the acceleration sensor. In general, an electric acceleration sensor and an electric igniter are used for this purpose. Therefore, the sensor requires a power supply, and electrical conductors are needed to conduct firing signals from the sensor to the igniter because the sensor is located in the front part of the vehicle, which is suitable for sensing acceleration, whereas the igniter is attached to the gas generator on the pretensioner or the air bag. The costs for components and the labor and time required for assembly and installation of electrical sensors have resulted in proposals for a low cost mechanical igniter in which neither a power supply nor electrical wiring is needed and a sensor itself constitutes an igniter.

One such mechanical igniter, as disclosed in U.S. Pat. No. 4,955,638, has a weight, a trigger lever and a firing pin. When a predetermined level of acceleration acts on the igniter, the trigger lever is activated by inertial movement of the weight, causing the spring-loaded firing pin to perform a percussive action, thereby firing a fuse of a gas generator. The igniter has a safety device for preventing an unintentional firing. The safety device has a shutter plate constituting a restraint member which is reciprocatingly movable between a position in which it prevents the firing pin from performing a percussive action and a position in which it allows a percussive action of the firing pin. The shutter plate is linked to and actuated by rotation of a set lever that functions as a controller for the safety device.

The provisions for preventing unintended firing of the above-described mechanical igniter further include a multiple erroneous actuation preventing device including a rotary shaft that restrains the weight and the firing pin and a device that holds the seat belt by a plunger interlocked with the shutter plate. Moreover, measures are taken to prevent accidental movement of the set lever. It is therefore considered that the degree of reliability of the safety device is extremely high. On the other hand, the safety device is difficult to operate because the measures taken to prevent accidental movement of the lever are very strict.

Although it is important to take all possible measures to ensure reliability of the operation of the safety device with a view to preventing an erroneous actuation of the mechanical igniter, it is also important to facilitate the manner in which the safety device is released. The requirement for ensuring reliability and the requirement for ease of operation conflict with each other, and it is not easy to meet them both simultaneously.

SUMMARY OF THE INVENTION

The present invention has been made in view of the above-described circumstances, and it is an object of the present invention to provide for use in a mechanical igniter for a gas generator a safety device that is highly reliable and at the same time can be easily released.

To attain the above-described object, the present invention provides a safety device for use in a mechanical igniter of the type that has a weight, a latch lever and a firing pin, which are provided in a casing as movable elements to fire a percussion cap attached to the gas generator in response to acceleration. The mechanical igniter further has a restraint member movably supported in the casing as a safety catch for making the movable elements immovable. The casing and the restraint member are respectively formed with cam surfaces which cooperate with each other to rotate the restraint member about its own axis so that the restraint member is selectively set in a restraint position and a release position. The restraint member has a rotary control portion concealed in the casing. The control portion has a portion for engagement with a rotary tightening tool.

In the above-described safety device of the present invention, the restraint member is rotated by turning a rotary tightening tool, which is used for an ordinary bolt tightening operation or the like, with the tool engaged with the rotary control portion of the restraint member, which is concealed in the casing. As a result of the rotation, the restraint member is displaced from the restraint position to the release position and set in the latter position by the cooperation of the cam surfaces respectively formed on the casing and the restraint member. Thus, the movable elements are released from the immovable state, thereby allowing the igniter to fire the percussion cap, which is attached to the gas generator, in response to acceleration.

With a safety device according to the present invention, since the rotary control portion of the restraint member is concealed in the igniter casing, it is possible to reliably prevent erroneous release of the safety device by a collision with an object during transport or assembling, which might otherwise occur before the safety device is intentionally and properly released. In addition, since the safety device can be released only with a rotary tightening tool, which is used in an ordinary assembling operation for a vehicle to which the safety device is to be attached, it is also possible to prevent undesired release of the safety device by a mistake in operation, although the operation of releasing the safety device is extremely simple.

DESCRIPTION OF THE EMBODIMENTS

Figure 3:
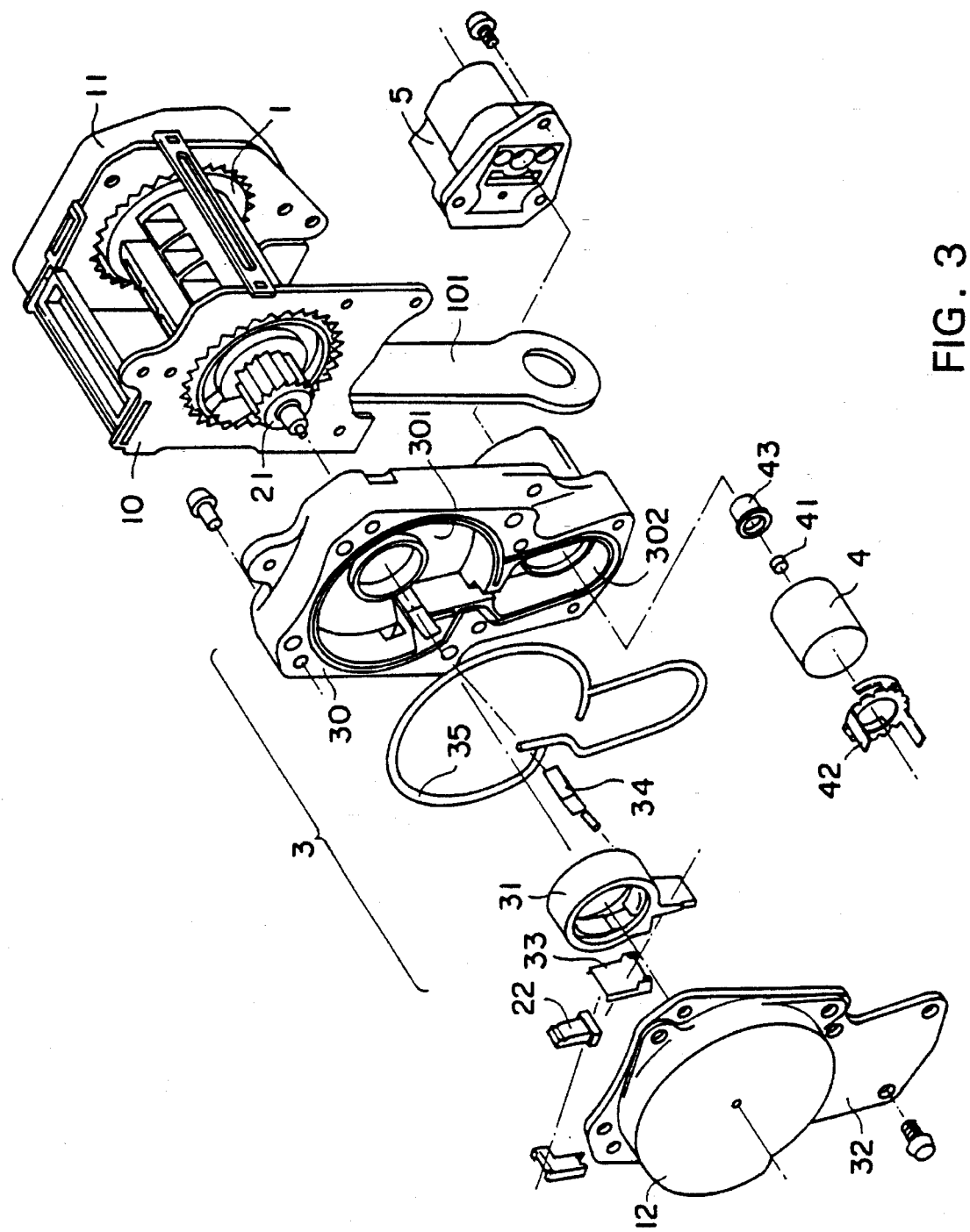
FIG. 3 is a partly exploded perspective view showing the general arrangement of a retractor with a pretensioner in which the safety device of the embodiment is used.

One embodiment in which an igniter according to the present invention is used to ignite a gas generator of a pretensioner integrated with a seat belt retractor is described below with reference to the accompanying drawings. One use of an igniter in which the present invention is applicable is to initiate the operation of the power source of a pretensioner for a seat belt retractor. As shown in FIG. 3, an example of such a retractor has a seat belt winding device 1, a gas-pressure actuator 3 connected to the seat belt winding device 1 through a clutch mechanism, a gas generator 4 for supplying a gas to the actuator 3, and a mechanical igniter 5 activated in response to acceleration to fire a percussion cap 41 attached to the gas generator 4.

The seat belt winding device 1 has a shaft which is supported at one end thereof by an emergency lock mechanism 11 and at the other end thereof by a take-up spring unit 12, thereby being rotatably supported on a retractor base 10. The clutch mechanism includes a ratchet wheel 21 which is fitted to one end of the seat belt winding device 1 in such a manner that the ratchet wheel 21 is unable to rotate relative to the seat belt winding device 1. The clutch mechanism further includes a clutch key 22, which is radially movably supported by a rotary piston 31 of the gas-pressure actuator 3 so as to be engageable with the ratchet wheel 21. The gas-pressure actuator 3 includes the rotary piston 31, a cylinder block 30 rotatably accommodating the rotary piston 31, and a lid 32 which closes the open end of the cylinder block 30. The cylinder block 30 has a cylinder chamber 301 for the rotary piston 31, and a gas supply chamber 302 formed adjacent to the cylinder chamber 301, in which the gas generator 4 is disposed. The gas generator 4, which has the percussion cap 41 fitted in one end thereof, is received in the gas supply chamber 302 and retained in place by a snap ring 42. The mechanical igniter 5 is attached to an end of the gas supply chamber 302 on the side thereof which is remote from the lid 32. Reference numeral 101 in FIG. 3 denotes a stay extending from the retractor base 10. A seal bush 43 hermetically seals the area between the cylinder block 30 and the mechanical igniter 5. A vane seal 33 hermetically seals the area between the vane portion of the rotary piston 31 and the cylinder block 30. A ring seal 34 hermetically seals the area between the ring portion of the rotary piston 31 and the cylinder block 30. A gasket 35 hermetically seals the area between the cylinder block 30 and the lid 32.

In the thus arranged seat belt retractor with a pretensioner, the mechanical igniter 5 fires the percussion cap 41 attached to the gas generator 4 in response to acceleration. As shown in detail in FIGS. 1 (sectional view) and 4 (exploded perspective view), the mechanical igniter 5 has a weight 51, a latch lever 52, and a firing pin 53, which are incorporated in an igniter casing 50 as movable elements. The mechanical igniter 5 further has a restraint member (a safety pin 60) for keeping at least one of the movable elements (the latch lever 52 in the embodiment) immovable.

The weight 51 of the mechanical igniter 5 in the embodiment is movably supported on a pair of slide bars 54, each of which is supported at one end by the igniter casing 50 and at the other end by the lid 501. The firing pin 53 is spring-loaded by a firing spring 55 and movably supported at one end by the igniter casing 50 and at the other end by the lid 501. The latch lever 52 is pivotally supported by the igniter casing 50 so as to face the weight 51 and is loaded with a set load by a set spring 56 to engage the firing pin 53 through a roller 57 supported by a pin. The latch lever 52 is rotated against the set load by inertial movement of the weight 51 so as to disengage from the firing pin 53, thereby allowing the firing pin 53 to perform a percussive firing action by the spring load. In the embodiment, a sub-lever 58 is provided in conjunction with the latch lever 52. The sub-lever 58 is rotatably disposed to face a side of the weight 51 which is opposite to the side thereof that faces the latch lever 52. Accordingly, the sub-lever 58 cooperates with the latch lever 52 to clamp the weight 51 from both sides of the direction of inertial movement of the weight 51.

Figure 1:
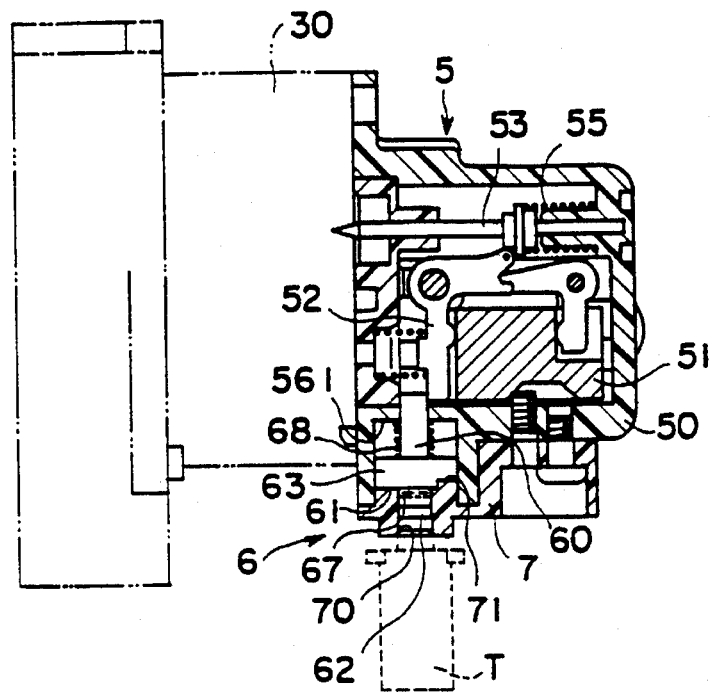
FIG. 1 is a side cross-sectional view of one embodiment in which the present invention is applied to ignition of a gas generator for a retractor with a pretensioner.
Figure 4:
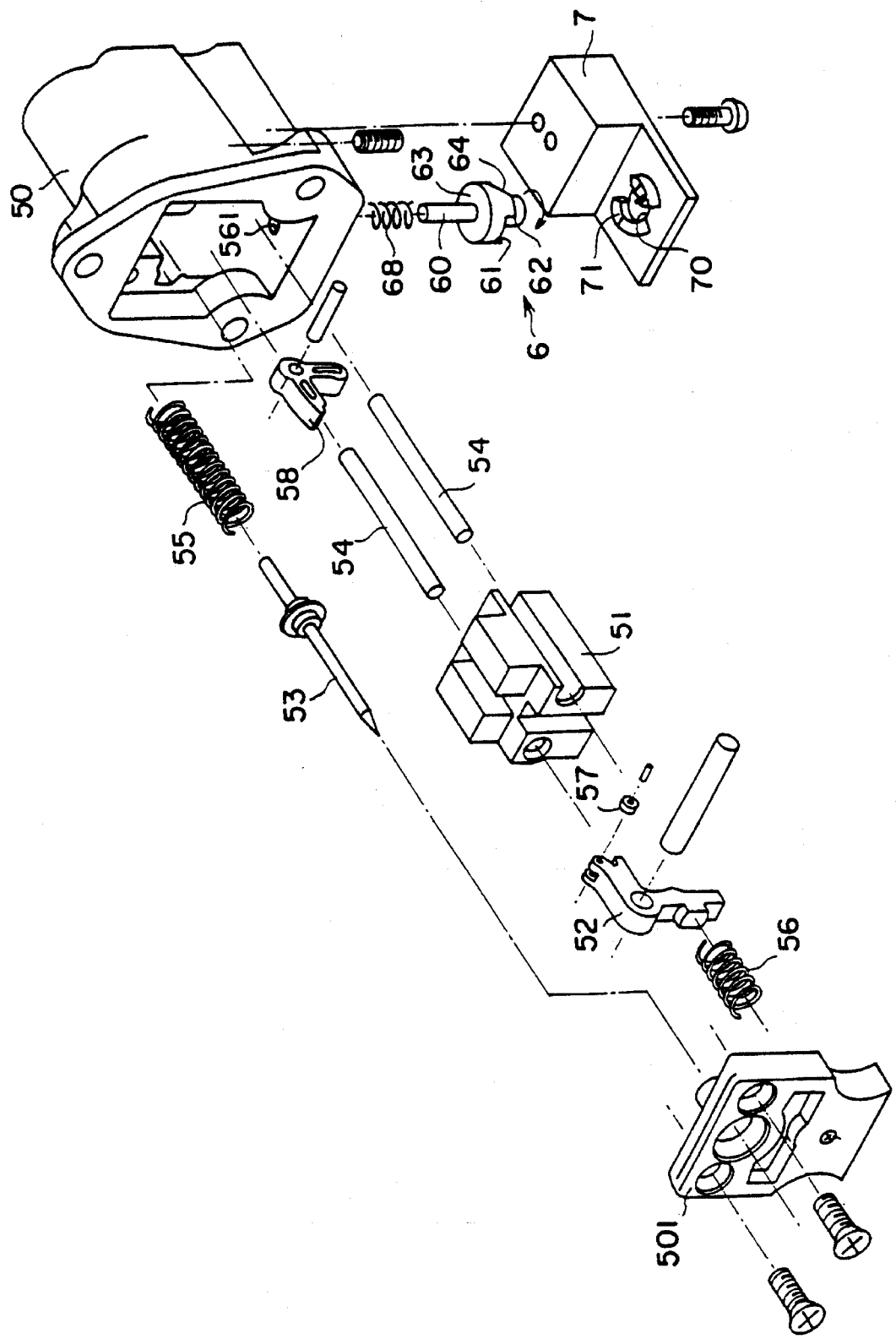
FIG. 4 is an exploded perspective view of the igniter according to the embodiment.

In the embodiment, the safety device 6 of the present invention is located in the lower part of the casing 50. The bottom plate 7 of the casing 50 and the safety pin 60 are, respectively, formed with a casing cam surface 71 and a safety pin cam surface 61, which cooperate with each other to rotate the safety pin 60 about its own axis so that the safety pin 60 is selectively set in a restraint position (the position illustrated in FIG. 1) and a release position (a position reached by rotating the pin 120° in the direction of the arrow in FIG. 4 from the illustrated position). The safety pin 60 has a rotary control portion 62 concealed in the casing 50. The rotary control portion 62 has a portion for engagement with the working end of a rotary tightening tool T (FIG. 1).

Figure 2:
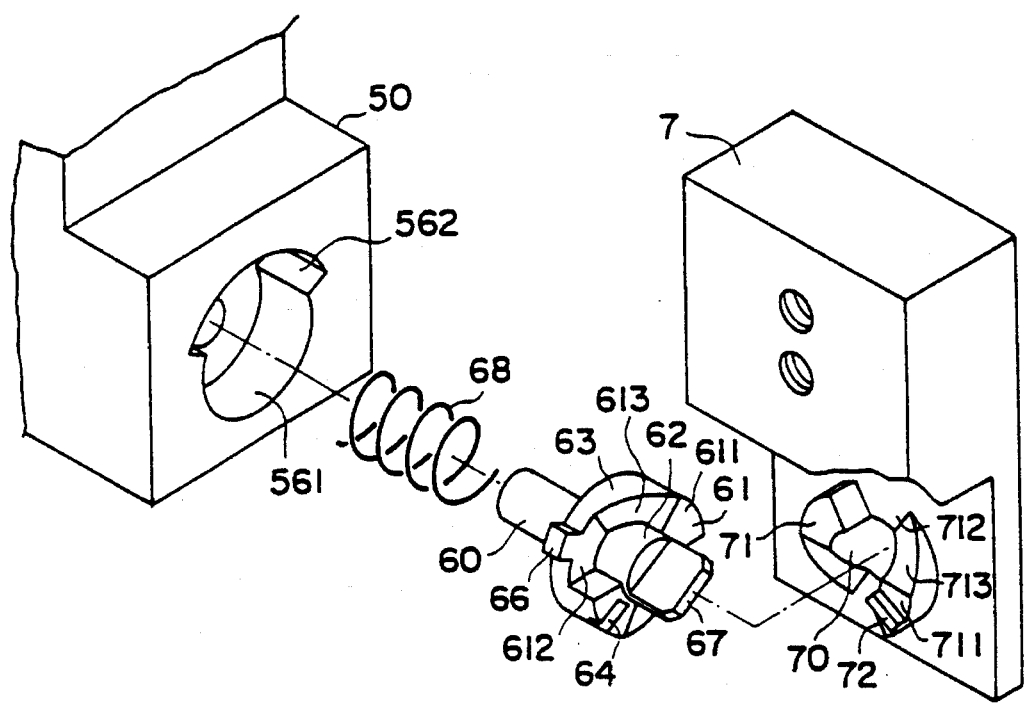
FIG. 2 is an enlarged, exploded perspective view of a safety device part of the embodiment shown in FIG. 1.

As shown in detail in the exploded perspective view of FIG. 2, the cam surface 71 on the bottom plate 7 of the casing 50 is, specifically, formed on the inner side of the bottom plate 7, which is fastened by screws to the bottom of the casing 50. The cam surface 71 has a pair of cam structures, each composed of a high 711, a low 712, and a slope 713 which connects the high 711 and the low 712. The high 711, the low 712 and the slope 713 are circumferentially disposed to extend through 60° each around an insertion hole 70 for the control portion 62 of the safety pin 60 so as to surround the control portion 62. At least one of the highs 711 of the cam is provided with a detent ridge 72. The body of the casing 50 is formed with a stepped hole 561 extending through the bottom wall of the body of the casing 50 to support the safety pin 60 so that the pin 60 is axially movable and rotatable about its own axis. One peripheral side of the large-diameter portion of the stepped hole 561 is further enlarged in diameter by a predetermined depth from the outer side of the bottom wall to form a sectorial rotatable range limiting groove 562 which has an angle of 120°.

The cam surface 61 formed on the safety pin 60 has a pair of cam structures each composed of a high 611, a low 612, and a slope 613 which connects the high 611 and the low 612. The high 611 and the low 612 are substantially in complementary relation to the high 711 and the low 712, which are formed on the bottom plate 7. The cam structures are formed on the outer end surface of an enlarged-diameter portion 63 of the safety pin 60. An elongated groove 64 which is engageable with the detent ridge 72 is formed on one of the highs 611 of the cam. In addition, a similar relief groove (which lies on the reverse side as viewed in the figure and hence cannot be seen) is formed at a position which faces the detent ridge 72 when rotated through 120°. Further, a rotatable range limiting projection 66 projects radially from the enlarged-diameter portion 63 so as to extend into the rotatable range limiting groove 562. A shaft portion that extends outwardly from the enlarged-diameter portion 63 constitutes the rotary control portion 62. Accordingly, the shaft portion has an engagement portion 67 formed on the outer end thereof. In the embodiment, the engagement portion 67 is a plate-shaped projection formed by axially cutting the outer end portion of the rotary control portion 62.

The safety device 6 composed of these members is assembled into a predetermined position as follows. As shown in FIG. 1, with a return spring 68 inserted into the stepped hole 561, the inner end portion of the safety pin 60 is fitted into the small-diameter portion of the stepped hole 561, and the bottom plate 7 is fastened by the screws to the bottom of the body of the casing 50 against the biasing force of the return spring 68 in a state where the highs of the cam formed on the enlarged-diameter portion 63 abut on the highs of the cam formed on the bottom plate 7. In this state, the safety pin 60 is set in the restraint position by virtue of the engagement between the elongated groove 64 and the detent ridge 72, which are respectively formed on the highs of the two cams, shown in FIG. 2. At this time, the rotatable range limiting projection 66 is placed at one terminal position in the rotatable range limiting groove 562.

In the thus arranged safety device for the igniter, the rotary tightening tool T, which is used in an ordinary assembling operation for a vehicle to which the safety device is to be attached, is inserted into the insertion hole 70 in the casing 50 and engaged with the engagement portion 67 provided on the rotary control portion 62 of the safety pin 60, which is concealed in the casing 50. Then, the tool T is turned with some pressure applied thereto. Consequently, the safety pin 60 is first slightly displaced in the axial direction, causing the elongated groove 64 and the detent projection 72 to disengage from each other. Then, the safety pin 60 rotates 120° as far as the position where the highs of the cams, which are respectively formed on the safety pin 60 and the bottom plate 7, face the lows of the cams. If the tool T is removed when this position is reached, the safety pin 60 is pushed out by the biasing force of the return spring 68 and thus axially displaced to reach the release position where the inner end of the safety pin 60 lies outside the path of rotation of the latch lever 52. Thus, the movable element is released from the immovable state, which has been maintained by the restraint of the latch lever 52, thereby allowing the igniter 5 to fire the percussion cap 41, which is attached to the gas generator 4, in response to acceleration.

Inasmuch as the rotary control portion 62 of the safety pin 60 is concealed in the igniter casing 50, the safety device 6 of the above-described embodiment prevents erroneous release of the safety device 6 by a collision with an object during transport or assembling, which might otherwise occur before the safety device 6 is intentionally and properly released. In addition, since the safety device 6 can be released only with a rotary tightening tool T, which is used in an ordinary assembling operation for a vehicle to which the safety device 6 is to be attached, it is also possible to prevent undesired release of the safety device 6 by a mistake in operation, although the operation of releasing the safety device 6 is extremely simple. In the embodiment, in particular, the slopes 613 and 713 are respectively formed between the high 611 and low 612 of one cam and between the high 711 and low 712 of the other cam. Therefore, even if the rotation of the safety pin 60 is sufficient, because the rotating operation with the tool T is incomplete when the tool T is removed, the axial force, which is derived from the biasing force of the return spring 68, is converted into rotational force. Therefore, the safety pin 60 is reliably set in the release position.

Figure 5:
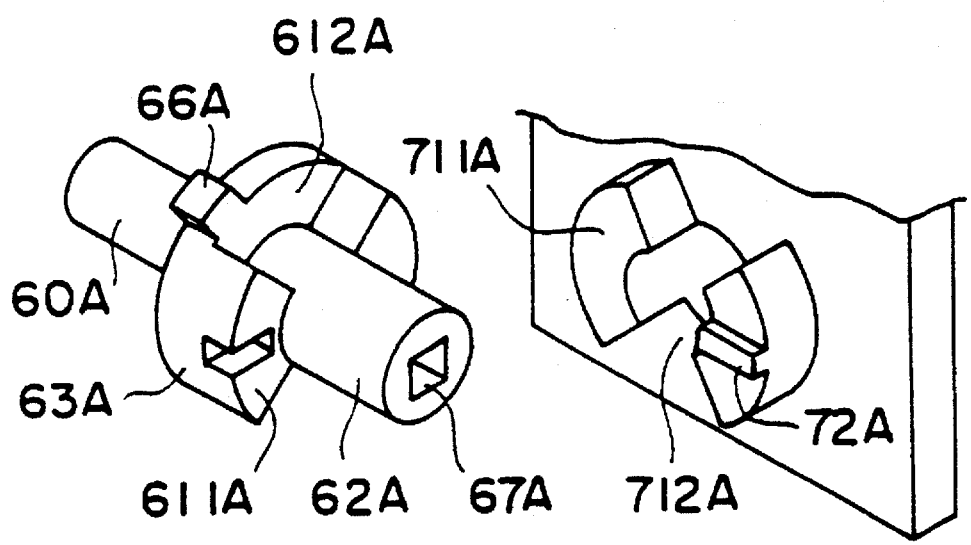
FIG. 5 is an enlarged, exploded perspective view showing a modified safety device in which the cam surface configuration is different from that of the embodiment.

FIG. 5 shows a modification of the above-described safety device. In this modification, with a view to simplifying the configuration of each of the cam surfaces, no slope is provided between the high 611A and low 612A of the cam formed on the safety pin 60A, and no slope is provided between the high 711A and low 712A of the cam formed on the bottom plate 7. As the engagement portion 67A of the rotary control portion 62A, a square hole, which is engageable with the working end of a wrench used as a rotary tightening tool T, is provided. Since the other portions are substantially the same as those in the above-described embodiment, these portions are denoted by the same reference numerals, but with the letter A suffix for distinction from the above-described embodiment, and no additional description is necessary or given here.

Although the present invention has described and shown above by way of an embodiment in which the present invention is applied to a pretensioner in a seat belt system, the present invention is not limited to the described embodiment and is also applicable, for example, to an inflator in an air bag system without changing the basic arrangement thereof. Moreover, various changes and modifications may be made in the embodiment without departing from the scope of the invention, as set forth in the appended claim.

I claim:

1. In a mechanical igniter for a gas generator, the mechanical igniter having a weight, a latch lever and a firing pin, which are received in a casing as movable elements and are arranged to fire a percussion cap attached to the gas generator in response to acceleration, the mechanical igniter further having restraint means movably supported in the casing as a safety catch for rendering the movable elements immovable in a restraint position and rendering the movable elements movable in a release position, a safety device comprising cam surfaces formed on the casing and cam surfaces formed on the restraint means, respectively, and cooperating with each other to rotate the restraint means about an axis of the restraint means so that the restraint means is selectively set in the restraint position and the release position, the restraint means having a rotary control portion concealed in the casing and the control portion having means for engagement by a rotary tightening tool.

2. The mechanical igniter of claim 1 wherein the safety device further comprises:

spring means for urging the cam surfaces of the restraint means toward the cam surfaces of the casing; and first rotation control means, on one of the cam surfaces of the restraint means, and second rotation control means, on one of the cam surfaces of the casing, for engaging with each other to restrict rotation of the restraint means;

whereby in the restraint position the first and second control means are engaged with each other under an urging force of the spring means.

* * * * *